H. O. TURNER,
Assignor to W. W. HEATH.
HAY KNIFE.
No. 9,991. Reissued Dec. 27, 1881.
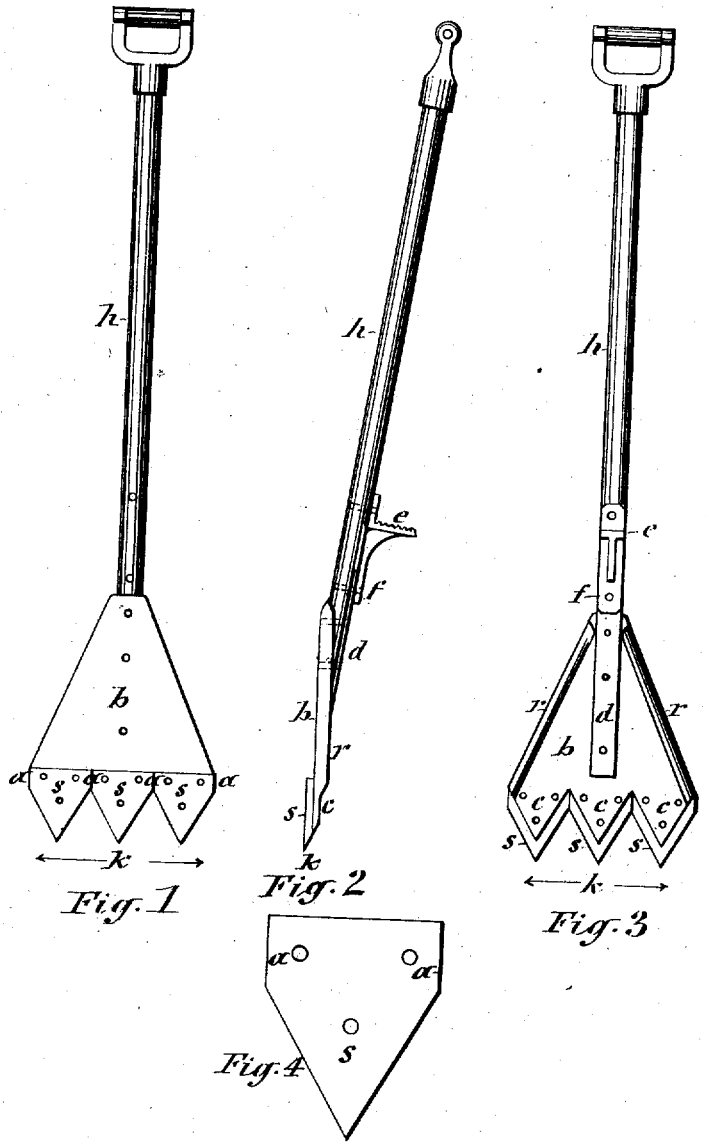
WITNESSES:
C. Bendixen.
E. Laass
INVENTOR:
Henry O. Turner
per Duell, Laass & Hey
Attorneys
N. PETERS, Photo-Lithographer, Washington, D. C.

UNITED STATES PATENT OFFICE.

HENRY O. TURNER, OF CAZENOVIA, NEW YORK, ASSIGNOR TO WILLIAM W. HEATH, OF SAME PLACE.

HAY-KNIFE.

SPECIFICATION forming part of Reissued Letters Patent No. 9,991, dated December 27, 1881.

Original No. 202,487, dated April 16, 1878. Application for reissue filed November 6, 1880.

*To all whom it may concern:*

Be it known that I, HENRY O. TURNER, of Cazenovia, in the county of Madison and State of New York, have invented new and useful Improvements in Hay-Knives, of which the following, taken in connection with the accompanying drawings, is a full, clear, and exact description.

This invention relates to improvements in hay-knives designed for cutting hay or straw from the mow or stack; and it consists, essentially, in a novel construction and combination of its constituent parts, whereby an implement is obtained which is strong, durable, and effective in its operation, easily manipulated, and readily repaired.

The invention is clearly illustrated in the accompanying drawings, wherein Figure 1 is a front view of my improved implement; Fig. 2, a side view of same; Fig. 3, a rear view, and Fig. 4 an enlarged view of one of the sections of the knife detached.

Similar letters of reference indicate corresponding parts.

*k* represents the knife-blade, which, for the purpose of increasing its effectiveness, is formed with a series of V-shaped cutting-edges, as shown in Figs. 1 and 3 of the drawings, experience having proved that a single V-shaped cutting-edge allows the hay or straw to yield to a great extent to the approach of the knife and deprives the same of its effectiveness. To facilitate the sharpening and repairs of the knife *k*, I construct the same of two or more sections, *s*, of steel plate, having their respective divergent cutting-edges terminating with parallel square shoulders *a* at the sides, by which the several sections are united and made to brace each other laterally. These sections are riveted or bolted to a blade, *b*, which has its bottom edge formed with a series of V-shaped extensions, *c*, fitted to the back of the sections *s* to thoroughly brace and stiffen the same. The blade *b* is of triangular form, having its sides divergent from the handle *h* toward the knife *k*. For the purpose of bracing this blade and preventing it from yielding to the transverse strain when in use, it is provided with a flange or rib, *r*, along its side edges, which ribs, extending from the handle *h* outward, brace the said blade both longitudinally and transversely. Its central part is braced by the handle *h*, which is fitted between the blade *b* and the shank *d*, which latter is permanently attached at its lower extremity to the blade *b*, and has its upper portion free from same, and extended some distance beyond the upper end thereof. The handle is secured between the blade *b* and shank *d* by means of bolts or rivets passing through the three parts, and an additional rivet or bolt passing through its upper extension and the handle and properly clinched or otherwise fastened.

*e* is the step or foot-piece for applying the foot for forcing the knife into the hay. It is cast onto a shank, *f*, by which it is attached to the implement. The shank *f* is of sufficient length to overlap the end of the shank *d*, and is secured by a bolt or rivet passing through the lower extremity of the shank *f* and through the shank *d* and the handle *h*, and by a bolt through its upper end and the handle, thus bracing the handle at its junction with the shank *d*. The upper surface of the step *e* is serrated to prevent the foot from slipping when applied during the manipulation of the implement.

Having thus described my invention, what I claim as new, and desire to secure by Letters Patent, is—

1. The knife *k*, composed of two or more sections, *s*, having their respective divergent cutting-edges terminating with the parallel square shoulders *a*, and united with the latter abutting against that of the adjacent section, in combination with the blade *b*, having its bottom edge formed with a series of V-shaped extensions, *c*, fitted to the back of sections *s*, substantially as described and shown, for the purpose set forth.

2. The triangular blade *b*, re-enforced at its sides by ribs *r* and provided at the center with shank *d*, permanently attached thereto at its lower extremity, and free from same from thence up, and extending above the same, in combination with the handle *h*, inserted between the shank *d* and blade *b*, and attached by rivets or bolts passing through said parts, constructed and combined substantially as described and shown, for the purpose set forth.

In testimony whereof I have signed my name and affixed my seal, in the presence of two attesting witnesses, at Cazenovia, in the county of Madison and State of New York, this 2d day of October, 1880.

HENRY O. TURNER. [L. S.]

Witnesses:

GEO. H. ATWELL,

J. C. COMSTOCK.